(12) United States Patent
Lam

(10) Patent No.: US 7,467,583 B2
(45) Date of Patent: Dec. 23, 2008

(54) TOASTER WITH MINI COOKER

(75) Inventor: Raymond Hoi-Tak Lam, Wanchai (HK)

(73) Assignee: South Asia International, Hong Kong (HK)

( * ) Notice: Subject to any disclaimer, the term of this patent is extended or adjusted under 35 U.S.C. 154(b) by 0 days.

(21) Appl. No.: 11/657,329

(22) Filed: Jan. 23, 2007

(65) Prior Publication Data

US 2008/0173185 A1  Jul. 24, 2008

(51) Int. Cl.
*A47J 37/08* (2006.01)
(52) U.S. Cl. ............... 99/327; 99/329 RT; 99/339; 99/357; 99/389; 99/391; 219/386; 219/392; 219/521
(58) Field of Classification Search ........... 99/327–333, 99/385–389, 257, 391–393, 339, 340; 219/386–392, 219/401, 428, 412–414; 426/418–420, 523
See application file for complete search history.

(56) References Cited

U.S. PATENT DOCUMENTS

| 2,345,769 | A | | 4/1944 | Osrow |
| 2,429,736 | A | | 10/1947 | Wales |
| 2,735,356 | A | * | 2/1956 | Sacks ........................ 99/339 |
| 3,377,943 | A | * | 4/1968 | Alleyne ...................... 99/419 |
| 3,635,146 | A | * | 1/1972 | Aubert ....................... 99/339 |
| 3,792,653 | A | * | 2/1974 | Davidson .................... 99/339 |
| 3,948,159 | A | * | 4/1976 | Vigerstrom ................. 99/358 |
| 4,116,020 | A | * | 9/1978 | Aucktor et al. ............. 464/145 |
| D323,094 | S | | 1/1992 | Russell et al. |
| 5,203,252 | A | | 4/1993 | Hsieh |
| D340,831 | S | | 11/1993 | Manabe |
| 5,694,831 | A | | 12/1997 | Haroun et al. |
| 6,016,741 | A | | 1/2000 | Tsai et al. |

(Continued)

FOREIGN PATENT DOCUMENTS

CN    01343156.0    4/2002

(Continued)

*Primary Examiner*—Timothy F. Simone
(74) *Attorney, Agent, or Firm*—Gallagher & Kennedy, P.A.; Thomas D. MacBlain

(57) ABSTRACT

A compact combined toaster and cooker includes in a single housing a toaster and a cooker that has first and second food-heating locations. The toaster is in most ways conventional, having at least one slot and at least one electrical heating element. The cooker has a separate electrical heating element. The first food-heating location of the cooker is recessed within the housing above the cooker's heating element. This first food-heating location opens upwardly from the housing to receive a cooking pan. The first food-heating location also opens through an opening in a face of the housing. The cooking pan has a handle that projects through this opening. The second food-heating location is within the housing and below the heating element. The second food-heating location receives a warming receptacle through a slot in the wall of the housing. The cooking pan handle is pivotally attached to the pan and locks in either an outwardly extended position or in a downwardly pivoted, contracted storage position. In its downwardly pivoted position the cooking pan handle extends across the slot that opens into the second food-heating location blocking removal of the warming receptacle. Electrical controls permit the user to adjust the temperature or the heating time duration of both of the toaster and cooker heating elements should.

12 Claims, 7 Drawing Sheets

U.S. PATENT DOCUMENTS

| | | | | |
|---|---|---|---|---|
| 6,058,829 A * | 5/2000 | Endres | ................... | 99/329 RT |
| 6,539,840 B2 * | 4/2003 | Choi et al. | .................... | 99/331 |
| 6,772,678 B2 | 8/2004 | Choi et al. | | |
| D525,472 S | 7/2006 | Beesley et al. | | |
| 7,250,588 B2 * | 7/2007 | Ely et al. | .................... | 219/386 |
| 2002/0060219 A1 | 5/2002 | Rypan | | |
| 2006/0182862 A1 | 8/2006 | Ely et al. | | |
| 2006/0191891 A1 | 8/2006 | Ely et al. | | |

FOREIGN PATENT DOCUMENTS

| | | |
|---|---|---|
| DE | 2818593 | 10/1979 |
| DE | 29718161 U | 2/1998 |
| HK | 0010171.3 | 2/2000 |
| JP | 55151287 | 11/1980 |
| JP | S55-151287 S | 11/1980 |

* cited by examiner

TOASTER WITH MINI COOKER

CROSS REFERENCE TO RELATED APPLICATIONS

This application is related to U.S. design patent application No. 29/270,073, of Raymond (Hoi Tak) Lam, filed Dec. 13, 2006 2006, and entitled Toaster with Mini Cooker.

FIELD OF THE INVENTION

This invention relates to cooking apparatus and more particularly to a combined toaster and cooker.

BACKGROUND OF THE INVENTION

Cooking appliances are known in the art that combine a conventional toaster with an electrical cooker. In U.S. published patent application No. 2006/0191891 A1 of Ely et al., dated Aug. 31, 2006, and U.S. design Pat. No. D525,472S of Beesley et al., dated Jul. 25, 2006, there is shown one such apparatus in which the toaster is combined with a steam cooker for steam cooking eggs or the like. In this patent literature, such an appliance is shown that has, in addition to the toaster heating element, a separate heating element for the cooker. In the single food-heating location there is provided a pan for water used to produce steam. A cup is situated in the food-heating location above the water-containing pan, and a perforated tray to steam-cook an egg or cooking breakfast meat, for example, sits above the cup.

A Japanese patent JP 55151287, published Nov. 25, 1980 shows a combination toaster, coffee maker and egg boiling unit gathered together on a single base. The base contains timing provisions to cause the toaster coffee maker and egg cooker to produce a meal with all three components finishing on time. A full-size toaster sits on the base as does the coffeemaker with its own hot plate as well as the egg cooking unit. The three separate cooking appliances are not unified within a single housing and the overall combination is not particularly compact.

A Hong Kong design registration number 0010171.3, dated Feb. 14, 2000 appears to combine a toaster oven with a coffeemaker. There does not appear to be several food cooking locations in addition to a conventional toaster.

A German utility model number DE29718161U, dated Feb. 5, 1998 shows side-by-side a hot-water cooker (which may also be a coffee or tea maker) a toaster, and an egg cooker on a single tray-like base. The three appliances are not combined into a single, unified unit, nor does the combination appear particularly compact.

There is need for a compact, attractive and unified toaster and cooker that has, in addition to conventional toaster, a cooker with multiple cooking locations served by a common electrical heating element.

BRIEF SUMMARY OF THE INVENTION

In accordance with the present invention, there is provided a compact and unified toaster and cooker wherein the cooker has plural food-heating locations arranged around one electrical heating element.

In accordance with a preferred, exemplary embodiment of the invention there is provided a combined toaster and cooker that has a toaster with a least one slot for receiving a food item into the toaster, a least one toaster heating element for toasting (or otherwise heating) the food item, a first electrical circuit for supplying electrical power to the toaster heating element including a first control to set at least one of the heating time and heating temperature, combined with a cooker that has a first heating location within the housing of the toaster and cooker to receive a first cookware item, a cooker heating element proximate a lower portion of the first heating location, a second heating location to receive a second cookware item located below the first cooking location and the cooker heating element, and a second electrical circuit for supplying electrical power to the cooker heating element including a second control to set at least one of the heating time and heating temperature.

In one aspect of a preferred, exemplary embodiment, a unitary housing houses the toaster and the cooker. The second heating location of the cooker opens through a substantially vertical face of the housing and the second cookware item is slid into the second heating location.

In another aspect of a preferred, exemplary embodiment, the first heating location opens through an upper surface of the housing. The first cookware item fits into the heating location and the opening through an upper surface of the housing allows a user to view the content in the first cookware item. The first cookware item may include a lid that can be lifted to allow the user to view the content.

An additional aspect of the preferred, exemplary embodiment of the invention is that the first food-heating location also opens outwardly through a substantially vertical wall of the housing and a handle of the first cookware item extends outwardly there. The handle of the first cookware item is pivotally connected to the first cookware item. It can be pivoted from a first, collapsed, downward extending position to a second, outwardly extending position for use in cooking. Preferably, in its downward extending position, the handle projects to the lower opening into the second food-heating location blocking removal of the second cookware item.

BRIEF DESCRIPTION OF THE DRAWINGS

FIG. 5*a* is a fragmentary, enlarged cross-sectional drawing showing the interrelationship of a pivoted pan handle and a connector attaching to a pan;

FIG. 6*a* is a partial exploded view showing the relationship of the pan handle, the connector and a U-shaped pin that interconnects the two.

DETAILED DESCRIPTION OF ONE OR MORE PREFERRED EMBODIMENTS OF THE INVENTION

Figure 1:
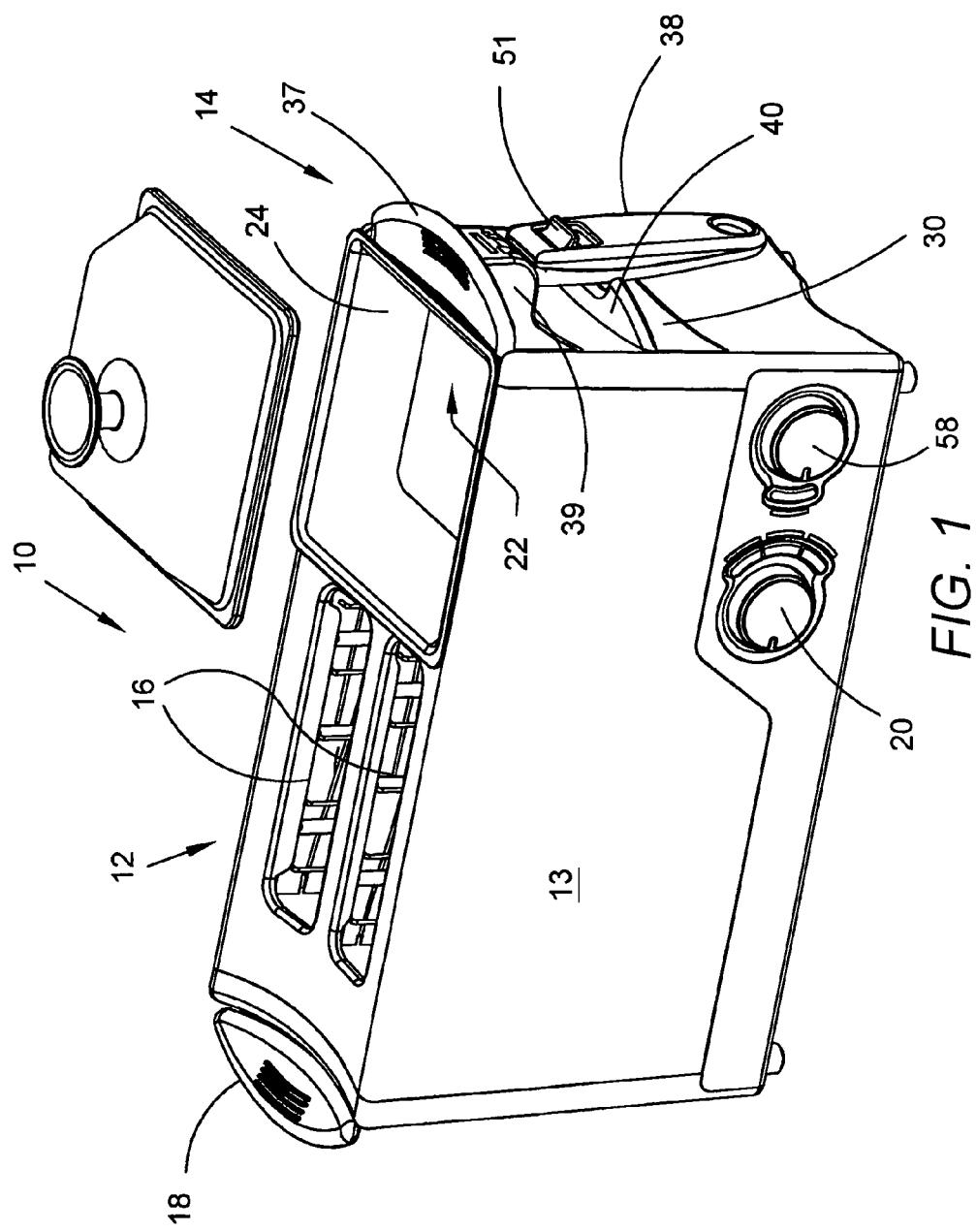
FIG. 1 is a perspective view of a combination toaster and cooker in accordance with the present invention.

As seen in FIG. 1, an appliance 10 combines a bread, bun or bagel toaster 12 and a small cooker 14. These are united in a single, common housing 13 with the toaster 12 at one side and the cooker 14 at the other side.

Figure 3:
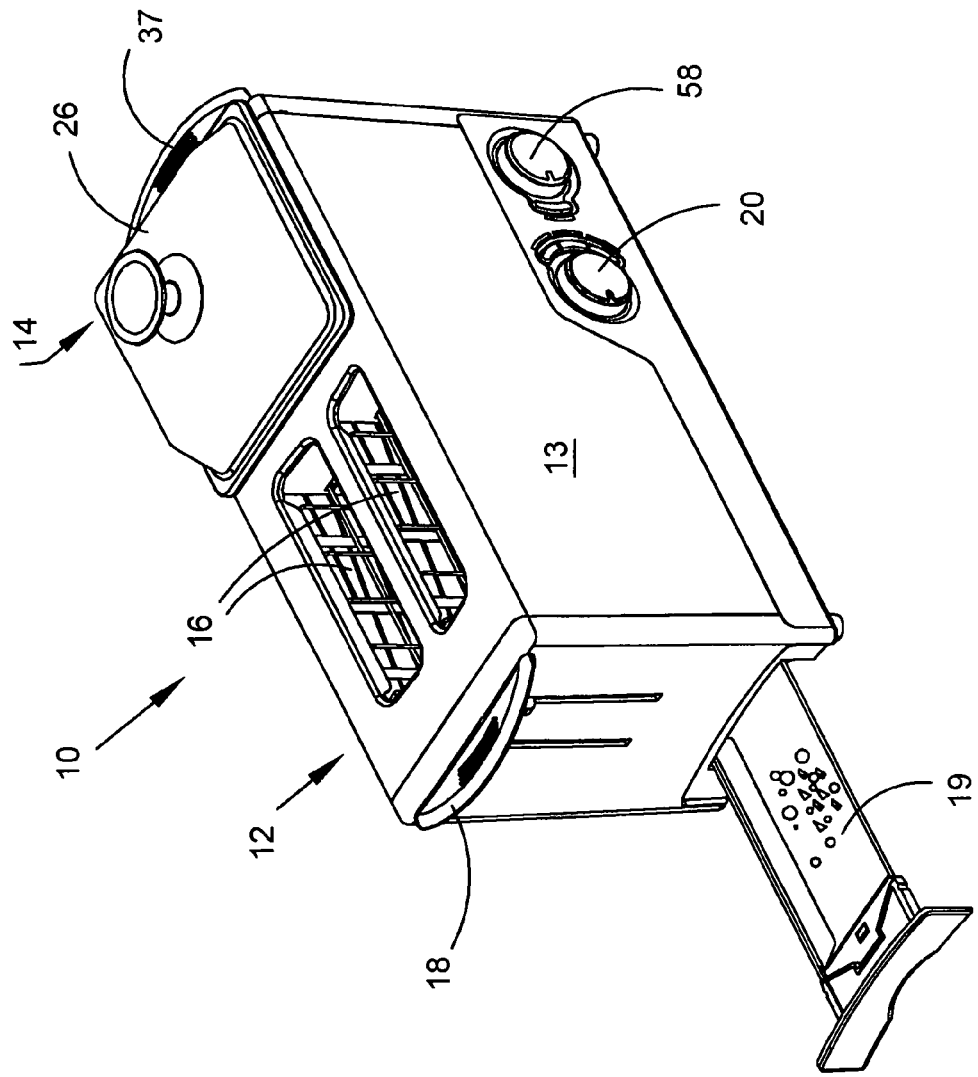
FIG. 3 is yet another perspective view of the toaster and cooker like that of FIG. 1, and shows the toaster end of the appliance with a crumb tray pulled out.
Figure 4:
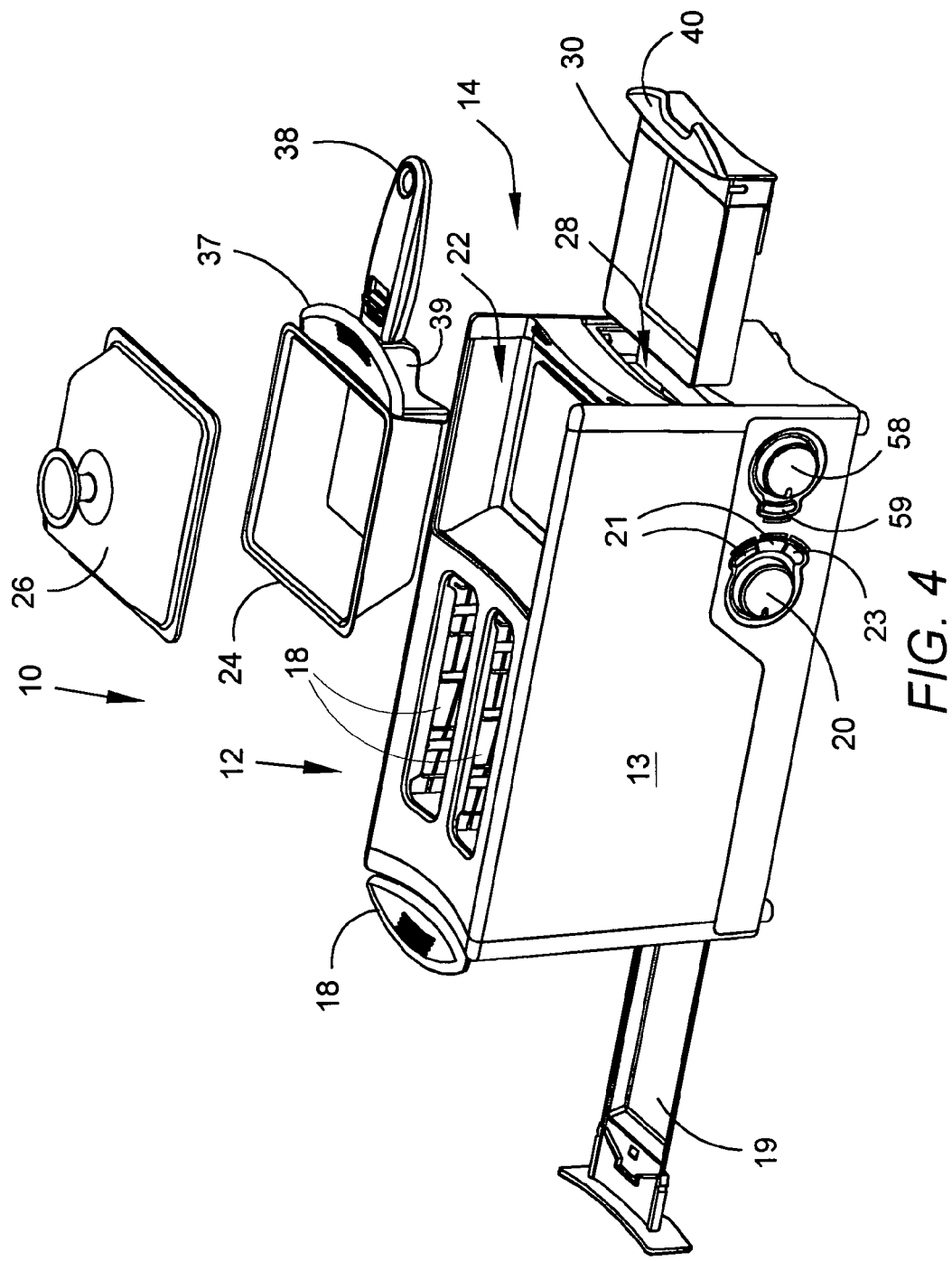
FIG. 4 is another perspective view of the toaster and cooker of FIG. 1, and shows a cooking pan and warming or defrosting container removed from their food-heating locations.

The toaster 12 is conventional, with bread slots 16 and a manually depressible handle 18 for lowering food items into the slots. Although shown with two slots, the toaster can have just one slot or more than the two slots shown. A control knob 20 permits controlling toasting by controlling the time that toasting heat is applied. As seen in FIG. 4, using one of a pair of buttons 21, increased toasting time to apply greater or lesser heat is applied as required by the type of food item being toasted or warmed, or by the type of warming desired (i.e. light or dark toasting or warming). Another of the buttons 21 can be used to reheat toast or other food by pushing and holding the button for as long as heating is desired. Controls other than the knob and button controls shown may be employed as are known in the art and without departure from the present invention. Another button 23 cancels the toasting by turning off the toaster 12. As shown in FIGS. 3 and 4, a crumb tray 19 may be provided for the cleaning out of crumbs as is known in the art. A heating wire or wires 25 are provided as the electrical toaster heating element as is conventional. The wires 25 can be wound on three mica plates 27 (one shown) located at sides of the slots 16. A spring-loaded latch mechanism 29, also conventional, is automatically released to lift the food items and the handle 18 after a set amount of time depending on the setting of the knob 20.

Figure 7:
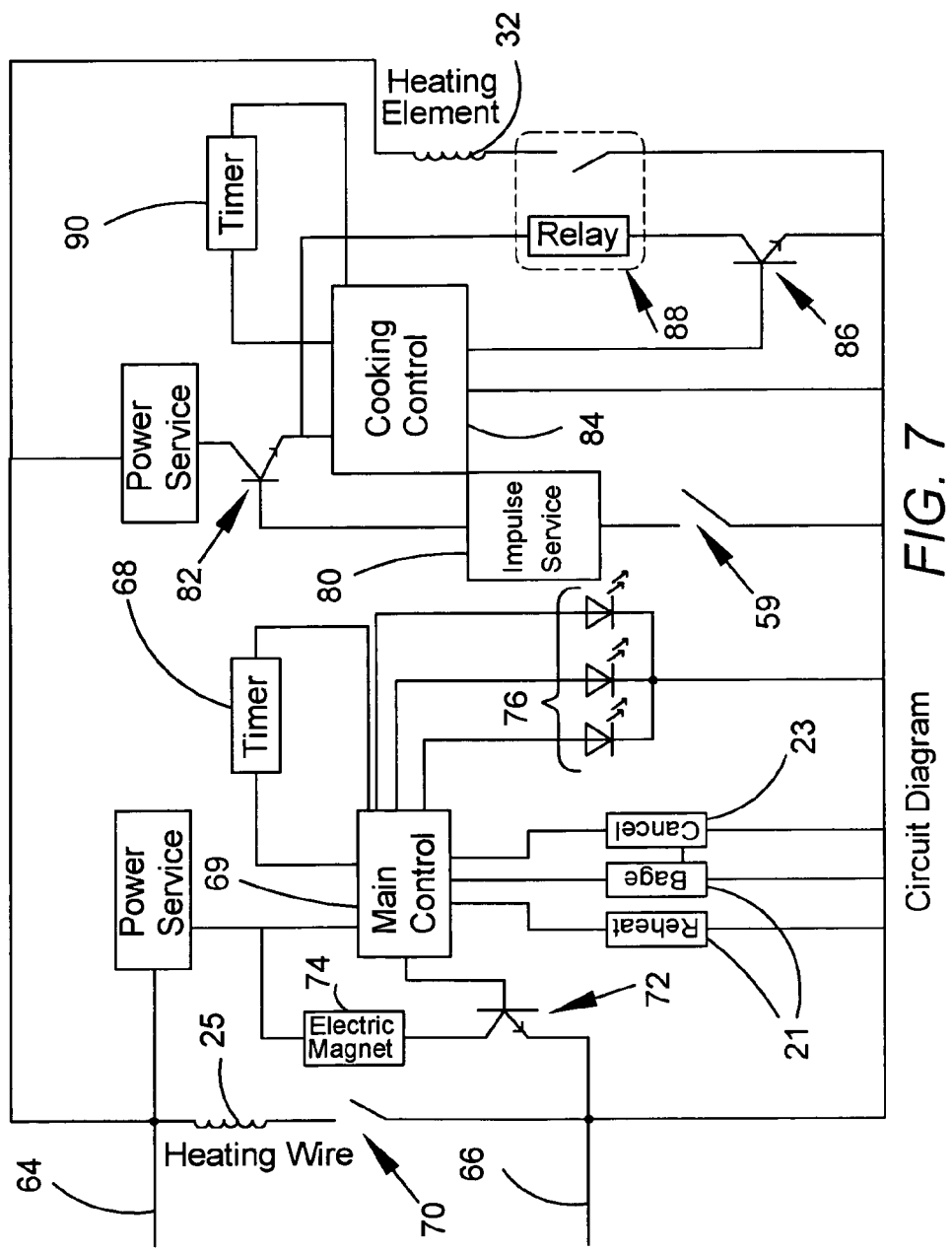
FIG. 7 is an exemplary, functional schematic diagram, partially in block diagram form, of one possible set of electrical supply and control provisions for an appliance like that of the preceding figures.

Electrical controls for the toaster 12 are diagrammatically illustrated in the functional block diagram of FIG. 7. These may be affected in any number of conventional means using any of a variety of commercially available electrical components. Household AC supply voltage is applied at lines 64 and 66. Turning the toaster control knob 20 and depressing the handle 18 of FIG. 1 starts a time 68 connected to a main toaster control circuit or controller 69. At the same time depression of the handle 18 lowers food items in the slots 16, latches the mechanism 29, and closes a switch 70 to direct household current through the heating wire or wires 25. When the timer 68 times out, the main control 69 is caused to turn on a transistor or other switching device 72. This energizes an electromagnet 74 which unlatches the latch mechanism 29 and opens the switch 70. A more difficult to cook or toast item, e.g. a bagel, is heated a longer time by pressing the "bagel" button 21. Toasting is stopped at any time by pushing the cancel button 23. To reheat toast or other items the handle 18 is depressed and the button 21 marked "reheat" is pushed until the item is warmed as desired. LEDs 76 under control of the main control 69 can be used to indicate activation of the buttons 21 or that the toaster is "on," for example. As an alternative to or in addition to time control as the means to control the amount of heating or toasting, it will be appreciated that the toaster temperature may be controlled.

The cooker 14 has a first food-heating location 22 into which is fit a pan 24 having a cover 26, preferably glass. The cooker 14 has a second food-heating location 28 which is better seen in FIGS. 4 and 5. A food container or receptacle 30 slips into the location 28.

Figure 5:
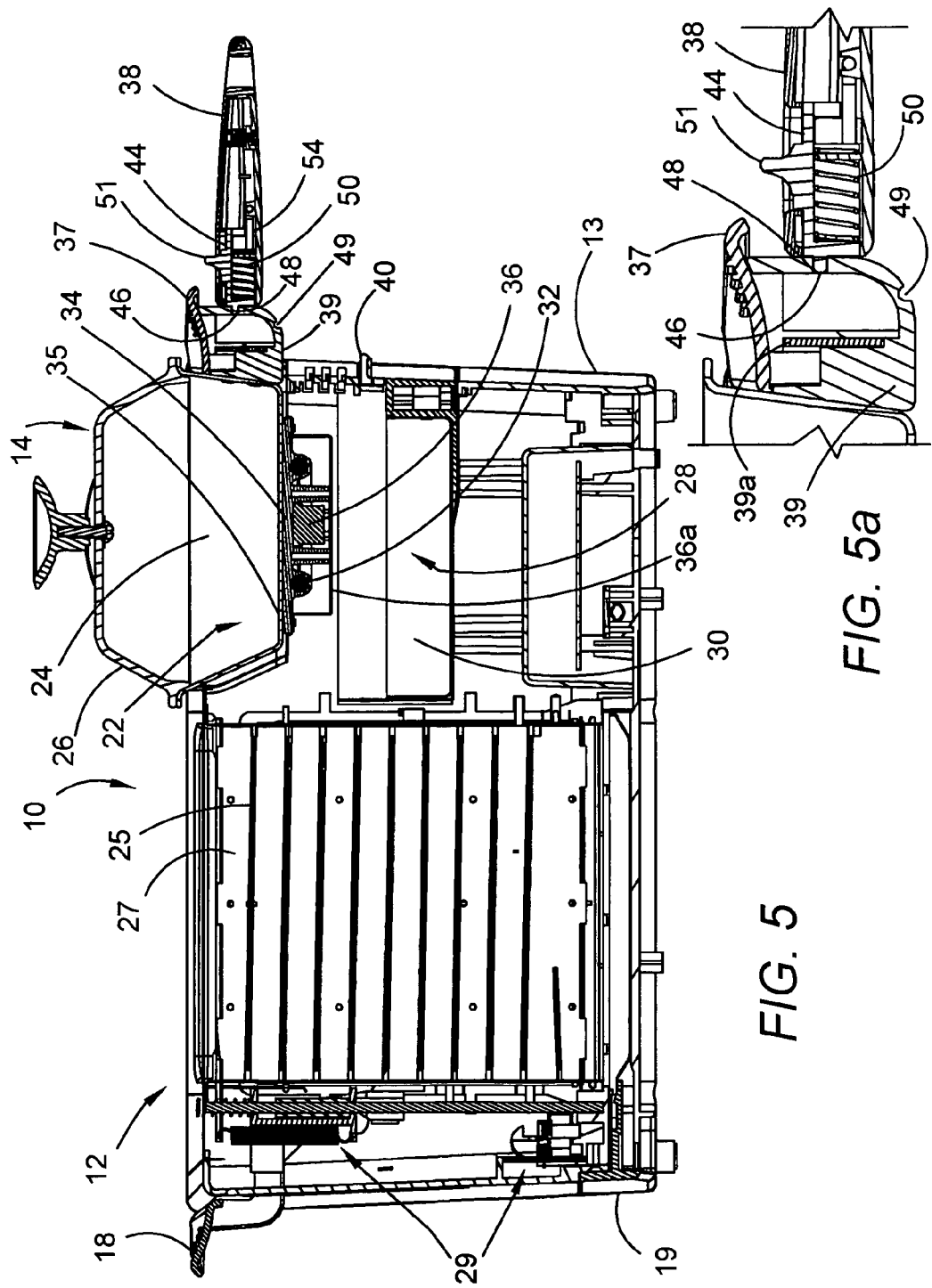
FIG. 5 is a cross-sectional view of the toaster and cooker appliance of FIG. 1, and shows the location of the cooking pan and warming or defrosting container relative to a heating element in the cooker portion of the appliance.

As shown in FIG. 5, a heating element 32, which may be a commercially available heat tube or Calrod, is attached to or molded into a heat-conductive heating plate 34. In the preferred, exemplary embodiment shown, the bottom 35 of the cooking pan 24 sits directly on the heating plate 34. A thermostat 36 is secured to the heating plate 34. A heat tube cover 36a encloses the heating element 32 and the thermostat 36. The container 30, sometimes called a defrost container or food warming container, is not so directly thermally coupled to the heating element 32 as is the pan 24. The container 28 is intended for warming or defrosting a food item, whereas the cooking pan 24 is intended for cooking small amounts of food such as, for example, one or two eggs.

As best seeing FIG. 1, the first food-heating location 22 opens upwardly through the common housing 13 of the combined toaster and cooker appliance 10. This permits a food item cooking in the pan 24 to be observed. The first food-heating location 22 opens, as well, through an end surface of the housing 13. This permits a projecting flange 37, handle connector 39 and a handle 38 to project from the heating location 22 and to be accessible to the user. The container 30, on the other hand, slides into and out of the second heating location 28 within the housing 13 in drawer-like fashion. It is manually inserted and removed using a flange-like pull 40.

Figure 6:
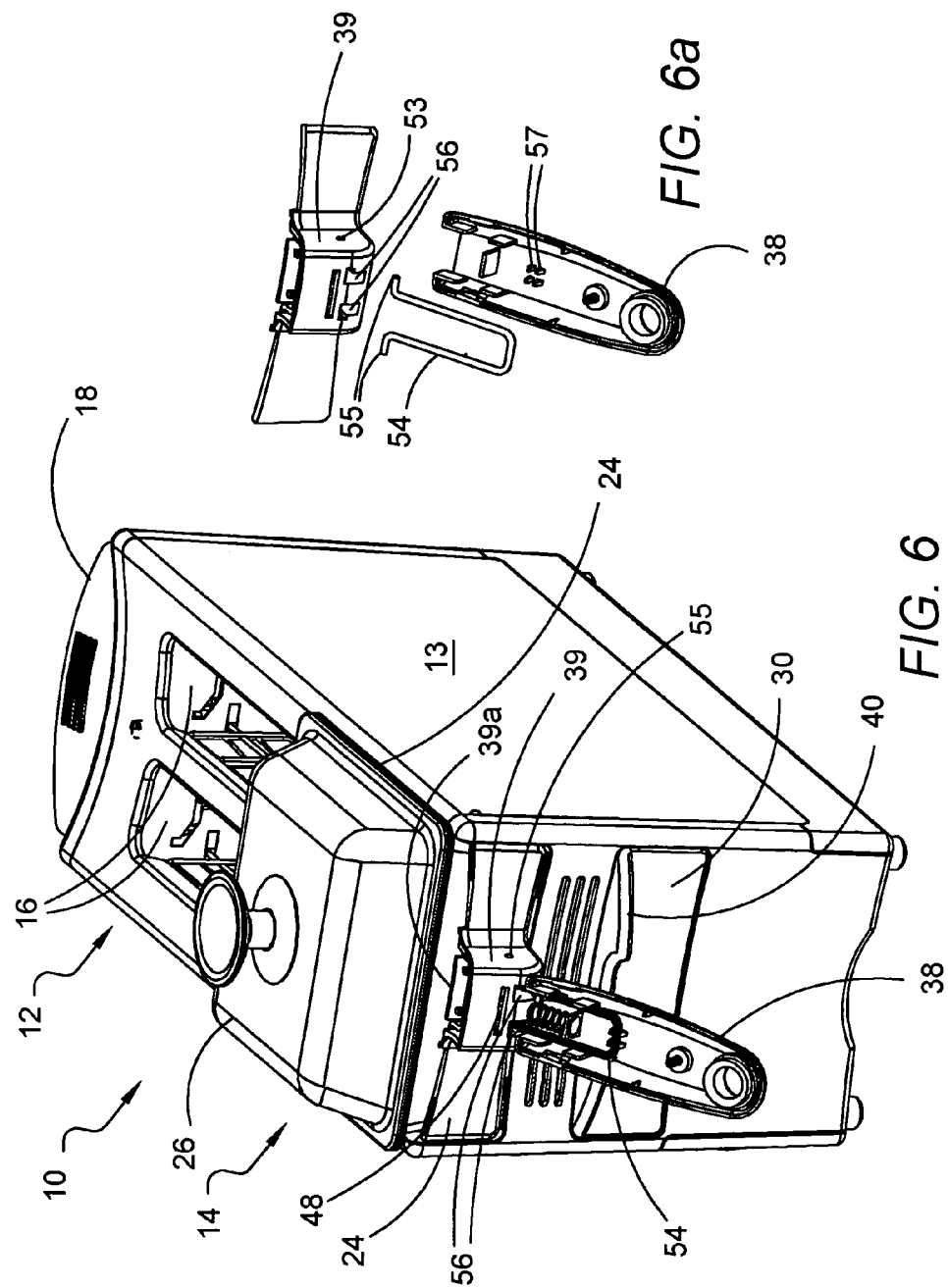
FIG. 6 is a fragmentary perspective view showing a spring-biased position locking mechanism of the pivotal handle of the pan.

Referring to FIGS. 5, 5a, and 6, and best seen in FIG. 5a, a slide 44 is located in the handle 38 and has a projecting detent 46 that can be seated in either of a pair of recesses or slots 48 and 49. A spring 50 biases the slide 44 toward the handle connector 39 so that the detent 46 normally projects out from within the handle 38. The slide 44 has a manually accessible knob or projection 51 that serves as an activator extending from the top of the handle to permit manual movement of the slide 44 against the bias of the spring by the thumb of a user to move the detent 46 out of the recess 48 or 49 to permit movement of the handle. The handle 38 is pivotally secured to the connector 39 by a U-shaped metal pin 54 shown in FIG. 6. The arms of the pin 54 extend into two vertical parallel slots 56 in the connector surface and into the interior of the connector. Within the connector 39 outwardly turned ends 55 of the arms of U-shaped pin 54 resiliently snap into a pair of recesses or openings 53 on sides of the connector 39, only one of which recesses or openings 53 is shown in FIG. 6a. A pair of integrally molded retainers 57 secures the U-shaped pin to the handle 38. A suitable bracket 39a, not shown in detail, can be employed to secure the connector 39 to the body of the pan as can other suitable fasteners or attaching means appropriate to the materials used.

Figure 2:
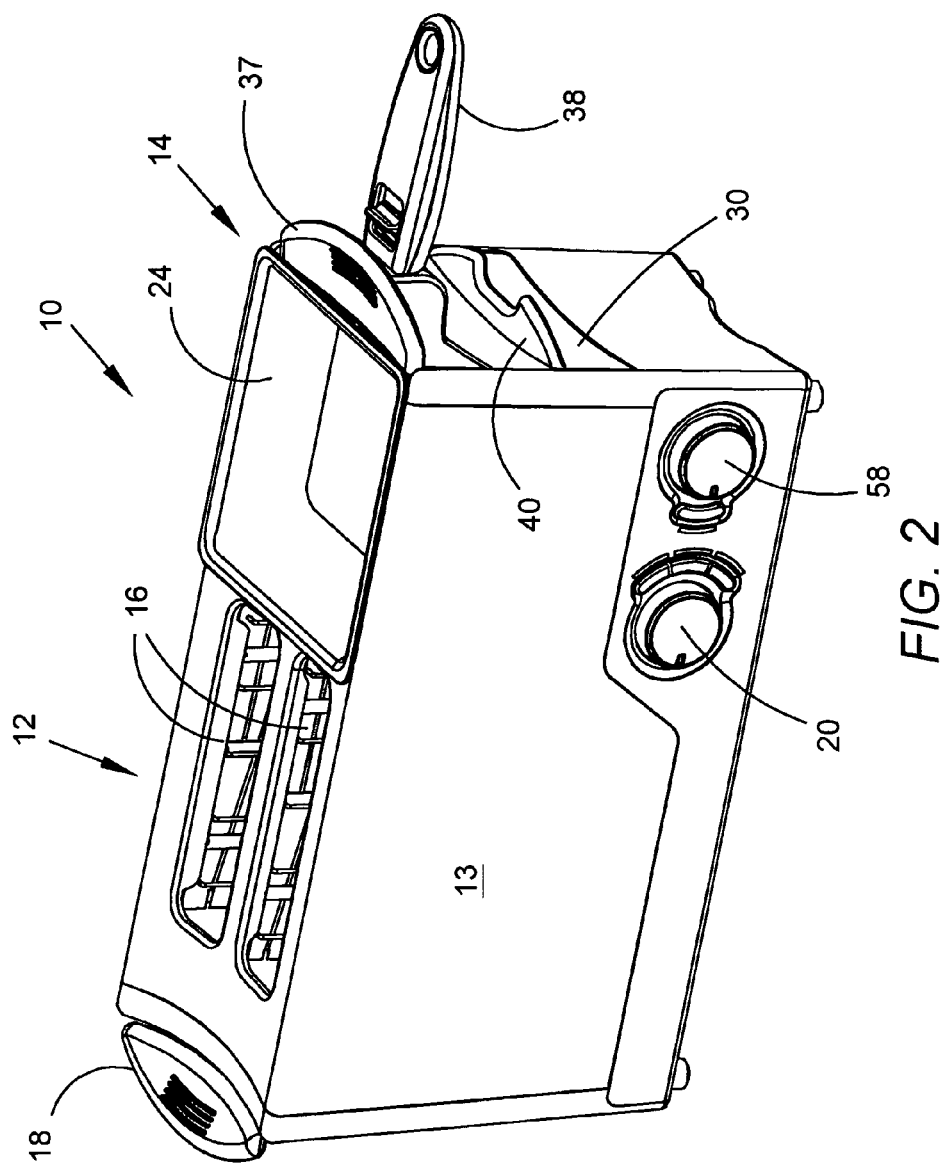
FIG. 2 is a further perspective view of the toaster and cooker like that of FIG. 1, and shows a pan with its pivotal handle tilted up for use.

In use, the handle 38 is pivoted to its outward extending position, shown in FIGS. 2, 4, and 5. A knob 58 controls the cooking time of the cooker 14. A button 59 seen in FIG. 4 turns the cooker 14 on and off. When the cooker 14 is not in use, the handle 38 can be pivoted downward to a collapsed, storage position as shown in FIG. 1. In its downward pivoted position, the handle 38 blocks removal of the container 28. As in the case of the toaster controls, controls of known types other than a knob 58 and button 59 can be employed without departure from the invention.

Referring to FIG. 7, the electrical control of the cooker 14 is diagrammatically illustrated. Depressing the "on/off" button 59 with the control knob 58 rotated to a desired cooking time causes an impulse source 80 to switch on a transistor or other switching device 82. A pair of AC-DC converters indicated by the blocks designated "Power Service" supplies required DC voltages. A controller 84 is caused to turn on a further transistor or other switching device 86 activating a relay 88. This switches household current to the cooker heating element 32. The thermostat 36, which is a component of the controller 84, serves to limit the temperature in the cooker 14 by causing the controller 84 to open the relay 88 as necessary and a timer 90, set by the knob 58, causes the controller 84 to open the relay 88 and stop cooking. Of course, pressing the "on/off" button 59 at any time will similarly end the cooking. Here too, cooking temperature may be controlled to control the heating of food in the cooker either as an alternative to, or in cooperation with, the control of the cooking time Although preferred embodiments of the invention have been described in detail, it will be readily appreciated by those skilled in the art that further modifications, alterations and additions to the invention embodiments disclosed may be made without departure from the spirit and scope of the invention as set forth in the appended claims.

I claim:

1. A combination toaster and cooker comprising:
   a) a toaster;
   b) a cooker sharing a housing with the toaster and including:
      (i) a heating element,
      (ii) a cooking pan receiving location above and in proximity to the heating element,
      (iii) a cooking pan receivable in the cooking pan receiving location,
      (iv) a warming receptacle location below and in proximity to the heating element,
      (v) a warming receptacle receivable in the warming receptacle location,
      (vi) the cooking pan having a handle pivotally mounted thereon for pivoting from a first collapsed, downward extending storage position to a second outward extending position for use in cooking.

2. The combination toaster and cooker according to claim 1, wherein the warming receptacle location includes a recess into an outer housing surface of the toaster and cooker for receiving the warming receptacle, and in its collapsed, downward extending storage position, the handle of the cooking pan extends downward to a location proximate the recess and blocking removal of the warming receptacle from within the recess.

3. The combination toaster and cooker according to claim 1, wherein the handle has a first end movably secured to a connector affixed to the cooking pan, a cooperating recess and spring-biased detent cooperating between the connector and the first end of the handle to lock the handle in each of its first collapsed, downward extending position and its second outward extending position.

4. The combination toaster and cooker according to claim 3, wherein the detent extends outward from the first end of the handle under the bias of a spring within the handle and is manually retractable against the bias of the spring by an activator movably supported on the handle.

5. The combination toaster and cooker according to claim 4, wherein the cooperating recess and spring-biased detent include first and second spaced apart recesses on the connection affixed to the cooking pan and located to receive a projecting end of the detent when the handle is in either of the first collapsed, downward extending position and second outward extending position.

6. A combination toaster and cooker comprising:
   a) a toaster having:
      (i) at least one slot for receiving an item into the toaster;
      (ii) at least one toaster heating element proximate a food article receiving location opening from within the toaster through the slot;
      (iii) a first electrical circuit for supplying electrical power to the at least one toaster heating element and including a first control to set at least one of the heating time and heating temperature afforded by the at least one toaster heating element; and
   b) a cooker sharing a housing with the toaster and including:
      (i) a first heating location within the housing to receive a first cookware item;
      (ii) a cooker heating element within the housing and proximate a lower portion of the first heating location,
      (iii) a second heating location within the housing to receive a second cookware item and located below the first cooking location and the cooker heating element;
      (iv) a second electrical circuit for supplying electrical power to the cooker heating element and including a second control to set at least one the heating time and heating temperature afforded by the cooker heating element.

7. The combination toaster and cooker according to claim 6, wherein the second heating location includes an opening thereto through a face of the housing and the second cookware item is slid into the second heating location through the opening.

8. The combination toaster and cooker according to claim 7, wherein the first heating location opens through an upper surface of the housing.

9. The combination toaster and cooker according to claim 8, wherein the first cookware item includes a lid removable upwardly to allow a user to view content in the first cookware item.

10. The combination toaster and cooker according to claim 9, wherein the first heating location also includes a further opening through a face of the housing.

11. The combination toaster and cooker according to claim 10, wherein the first cookware item includes a handle extending through the further opening in the face of the housing when the first cookware item is in place in the first heating location.

12. The combination toaster and cooker according to claim 11, wherein the handle is pivotally attached to the first cookware item to pivot between an outward extending position to a downward extending position.

* * * * *